United States Patent
Sakai et al.

(10) Patent No.: US 9,152,873 B2
(45) Date of Patent: Oct. 6, 2015

(54) DEVICE AND METHOD FOR DETERMINING AN OPTIMUM IMAGE

(71) Applicant: OMRON Corporation, Kyoto (JP)

(72) Inventors: Shun Sakai, Kusatsu (JP); Motoo Yamamoto, Kyoto (JP); Hiroyuki Tanaka, Hikone (JP); Tatsuya Murakami, Suita (JP); Yuki Hanzawa, Nara (JP); Takahiro Takayama, Kusatsu (JP)

(73) Assignee: Omron Corporation, Kyoto-shi (JP)

( * ) Notice: Subject to any disclaimer, the term of this patent is extended or adjusted under 35 U.S.C. 154(b) by 157 days.

(21) Appl. No.: 14/024,024

(22) Filed: Sep. 11, 2013

(65) Prior Publication Data

US 2014/0072221 A1 Mar. 13, 2014

(30) Foreign Application Priority Data

Sep. 13, 2012 (JP) ................. 2012-201972

(51) Int. Cl.
| | |
|---|---|
| G06K 9/36 | (2006.01) |
| G06K 9/32 | (2006.01) |
| G06T 7/00 | (2006.01) |
| H04N 5/232 | (2006.01) |

(52) U.S. Cl.
CPC ............ *G06K 9/3233* (2013.01); *G06T 7/0002* (2013.01); *G06T 7/0081* (2013.01); *H04N 5/23222* (2013.01); *G06T 2207/10004* (2013.01); *G06T 2207/20144* (2013.01); *G06T 2207/30168* (2013.01); *G06T 2207/30201* (2013.01); *H04N 5/23229* (2013.01)

(58) Field of Classification Search
None
See application file for complete search history.

(56) References Cited

U.S. PATENT DOCUMENTS

| | | | |
|---|---|---|---|
| 2006/0256396 A1* | 11/2006 | Ejima et al. | ................... 358/448 |
| 2008/0266406 A1 | 10/2008 | McLeod et al. | |
| 2008/0309777 A1 | 12/2008 | Aoyama | |

(Continued)

FOREIGN PATENT DOCUMENTS

| | | |
|---|---|---|
| JP | 2000-209483 A | 7/2000 |
| JP | 2010-079446 A | 4/2010 |

OTHER PUBLICATIONS

Extended European Search Report for Application No. 13182150.6 issued Feb. 20, 2014 (10 pages).

*Primary Examiner* — Brian P Werner
(74) *Attorney, Agent, or Firm* — Nutter McClennen & Fish LLP; John J. Penny, Jr.

(57) ABSTRACT

An image processing device selects an image in which sharpness of a photographic subject is relatively high compared with sharpness of a background. The image processing device includes a photographic subject detection unit that identifies a photographic subject region on an image, which includes a predetermined photographic subject, by detecting the predetermined photographic subject from the image, a background region identifying unit that identifies a background region on the image, which is other than the photographic subject region, a sharpness identifying unit that identifies sharpness of the photographic subject region and sharpness of the background region, a score calculation unit that calculates a score based on a difference in the sharpness between the photographic subject region and the background region, and a determination unit which determines the image as an optimum image when the score indicates that photographic subject region is clearer than the background region.

13 Claims, 11 Drawing Sheets

(56) References Cited

U.S. PATENT DOCUMENTS

2011/0116726 A1 5/2011 Hosaka et al.
2012/0189225 A1 7/2012 Li
2013/0329106 A1* 12/2013 Bigioi et al. .................. 348/308

* cited by examiner

FIG. 2

| PHOTOGRAPHIC SUBJECT | OPTIMUM IMAGE THRESHOLD |
|---|---|
| HUMAN BEING | Th(human) |
| CAT | Th(cat) |
| PC | Th(pc) |
| TARO YAMADA | Th(yamada) |
| ⋮ | ⋮ |

FIG. 3

| SCENE | OPTIMUM IMAGE THRESHOLD |
|---|---|
| SEASHORE | Th(beach) |
| SNOW-COVERED MOUNTAIN | Th(snowmount) |
| EVENING GLOW | Th(sunset) |
| NIGHT VIEW | Th(night) |
| ⋮ | ⋮ |

FIG. 4

| PHOTOGRAPHIC SUBJECT | SCENE | | | | |
| --- | --- | --- | --- | --- | --- |
| | SEASHORE | SNOW-COVERED | EVENING GLOW | NIGHT VIEW | ... |
| HUMAN BEING | Th(human_beach) | Th(human_snowmount) | Th(human_sunset) | Th(human_night) | ... |
| CAT | Th(cat_beach) | Th(cat_snowmount) | Th(cat_sunset) | Th(cat_night) | ... |
| PC | Th(pc_beach) | Th(pc_snowmount) | Th(pc_sunset) | Th(pc_night) | ... |
| TARO YAMADA | Th(yamada_beach) | Th(yamada_snowmount) | Th(yamada_sunset) | Th(yamada_night) | ... |
| ... | ... | ... | ... | ... | ... |

FIG. 14

| IMAGE | $f(\alpha)$ | $f(\beta)$ | SCORE CALCULATION $\gamma \times (f(\alpha) - f(\beta))$ $\gamma = 1$ | | SCORE CALCULATION $\gamma \times (f(\alpha) - f(\beta))$ $\gamma = f(\alpha)$ | | SCORE CALCULATION $\gamma \times (f(\alpha) - f(\beta))$ $\gamma = 1000 - f(\beta)$ | |
|---|---|---|---|---|---|---|---|---|
| | | | | RANKING | | RANKING | | RANKING |
| A | 750 | 210 | 540 | 1 | 405000 | 2 | 426600 | 2 |
| B | 1000 | 550 | 450 | 3 | 450000 | 1 | 202500 | 3 |
| C | 600 | 110 | 490 | 2 | 294000 | 3 | 436100 | 1 |
| D | 900 | 850 | 50 | 4 | 45000 | 4 | 7500 | 5 |
| E | 100 | 50 | 50 | 4 | 5000 | 5 | 47500 | 4 |

DEVICE AND METHOD FOR DETERMINING AN OPTIMUM IMAGE

CROSS-REFERENCE TO RELATED APPLICATION

This application claims the benefit of priority from Japanese Patent Application No. 2012-201972, filed on 13 Sep. 2012, the entire contents of which is incorporated herein by reference for all purposes.

TECHNICAL FIELD

The present invention relates to an image processing device that selects an optimum image, an image processing method, and a computer readable medium.

BACKGROUND OF THE INVENTION

Conventionally, there is an existing electronic device which has an album function of arranging images such as photographs etc. imaged, or a slide show function of displaying the images. Although a user browses the images using such an electronic device, it is extremely complicated for the user to select a desired image from among a lot of images.

To this end, a technology is developed in which images where a photographic subject is clearly reflected are selected from among a lot of photographed and stored images. For example, Japanese Unexamined Patent Publication No. 2000-209483 discloses a technology in which image data is selected according to only the quality of an image of a photographic subject, without being affected by blurring of an image of a background, etc. In addition, Japanese Unexamined Patent Publication No. 2010-79446 discloses a technology in which whether a photographic subject is blurred is evaluated and a user selects out unnecessary blurred images.

There is a case where a user desires an image, in which a photographic subject is conspicuous, obtained by macro shooting or moving object shooting called panning. Specifically, as illustrated in FIG. 16, it may be an image in which only a photographic subject is clear and a background is fading or blurred.

However, the above-mentioned conventional technologies cannot distinguish an image shown in FIG. 16 and an image shown in FIG. 17 from each other when sharpness of a photographic subject is the same as that of a background. That is, the above-mentioned conventional technologies have a problem in that an image in which sharpness of a photographic subject is relatively high compared with sharpness of a background cannot be distinguished.

SUMMARY

In accordance with one aspect of at least one embodiment of the present invention, there is provided an image processing device for selecting an image, the image processing device includes: a detection part configured to detect a predetermined photographic subject from an image; a photographic subject region identifying part configured to identify a photographic subject region that is a region on the image, the region including the predetermined photographic subject detected by the detection part; a background region identifying part configured to identify a background region that is a region on the image, the region being other than the photographic subject region identified by the photographic subject region identifying part; a sharpness identifying part configured to identify sharpness of the photographic subject region and sharpness of the background region; a score calculation part configured to calculate a score, based on a difference in the sharpness between the photographic subject region and the background region; and a determination part that determines the image as an optimum image when the score calculated by the score calculation part is compared with an optimum image threshold and the score indicates that the photographic subject region is clearer than the background region.

In accordance with another aspect of at least one embodiment of the present invention, there is provided an image processing method for selecting an image, the image processing method includes: detecting a predetermined photographic subject from an image; identifying a photographic subject region that is a region on the image, the region including the predetermined photographic subject detected in the detecting; identifying a background region that is a region on the image, the region being other than the photographic subject region identified in the identifying of the photographic subject region; identifying sharpness of the photographic subject region and sharpness of the background region; calculating a score, based on a difference in the sharpness between the photographic subject region and the background region; and determining the image as an optimum image when the score calculated in the calculating is compared with an optimum image threshold and the score indicates that the photographic subject region is clearer than the background region.

BRIEF DESCRIPTION OF THE DRAWINGS

FIG. 2 is a diagram illustrating an example of threshold information stored in a storage unit of the image processing device;

FIG. 3 is a diagram illustrating an example of threshold information stored in a storage unit of the image processing device;

FIG. 4 is a diagram illustrating an example of threshold information stored in a storage unit of the image processing device;

FIG. 14 is a diagram illustrating an example of a method of calculating a score based on weighting;

DETAILED DESCRIPTION

The present invention is made in view of the above-mentioned problem, and an object of the present invention may be to provide an image processing device, an image processing method, and a computer readable medium which selects an image in which a photographic subject has a relatively high sharpness compared with a background.

Embodiments of the present invention are described with reference to FIGS. 1 to 15.

[Configuration of Image Processing Device]

Firstly, an image processing device is described with reference to FIG. 1. The image processing device selects an image in which sharpness of a predetermined photographic subject is relatively high compared with sharpness of a background. The term "photographic subject" represents an object having a certain shape on an image. For example, it may be a whole body or face of a human being; a whole body or face of an animal such as a dog, a cat, and a bird; a plant such as a flower and a tree; a vehicle such as a car, a motorcycle and a train; a construction such as a building and a house; or a natural object such as a tree, cloud, and the sun. The term "background" represents a portion other than the photographic subject on the image. The photographic subject may be (a face of) a human being, a pet, etc. which are registered beforehand. An image in which the sharpness of the photographic subject is relatively high compared with the sharpness of the background is referred to as an optimum image, and an image in which the sharpness of the photographic subject is not relatively high compared with the sharpness of the background is referred to as a non-optimum image.

The image processing device may be any type as long as it is configured to select an optimum image. For example, it may be mounted in an electronic apparatus such as a PC, a digital camera, a digital video, a mobile phone, a smart phone, a printer, a digital television set, a PDA (Personal Digital Assistant), a game machine, a device that takes and prints a photograph, and a device to edit an image.

Figure 1:
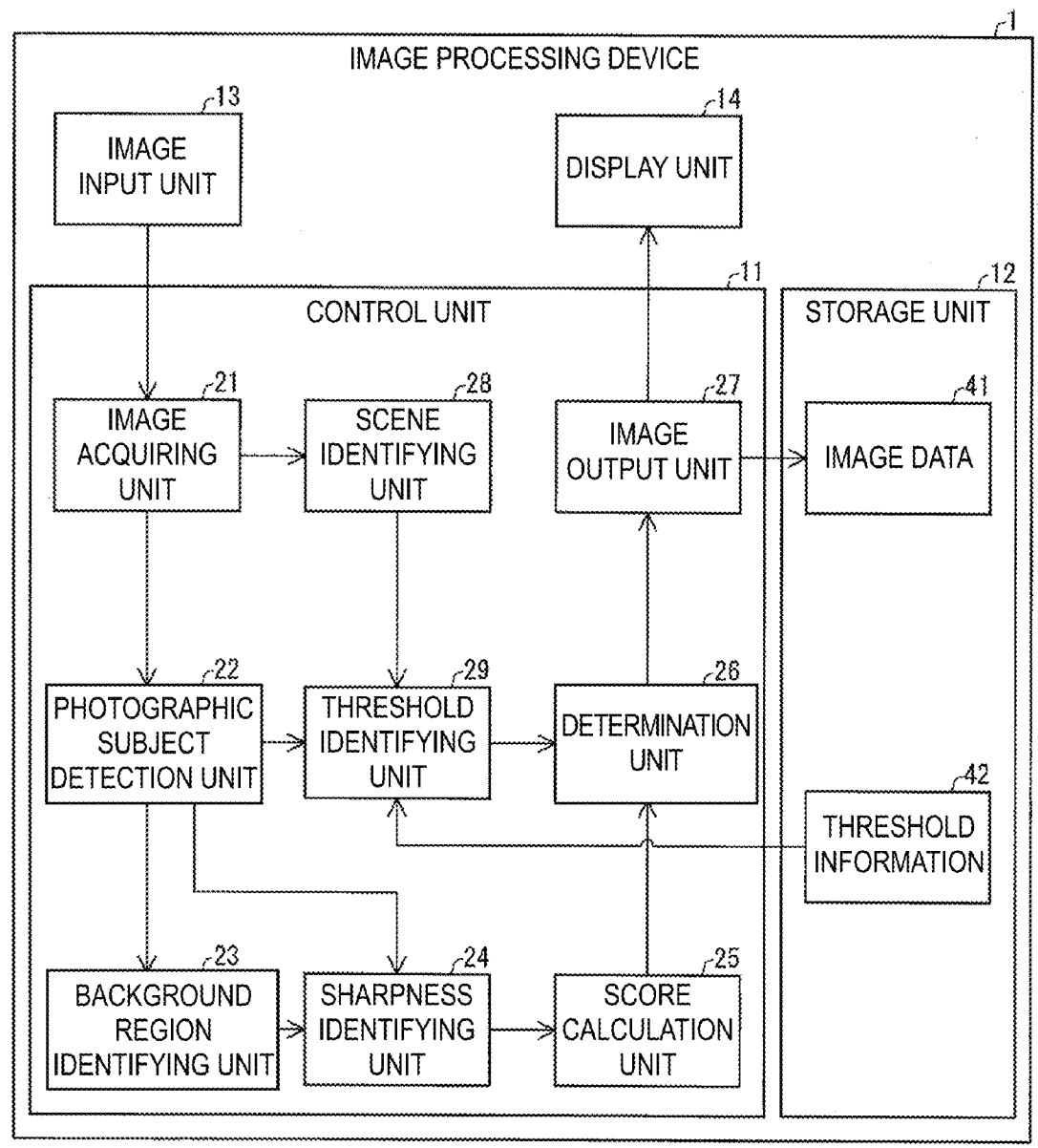
FIG. 1 is a block diagram illustrating the structure of a main part of an image processing device according to one embodiment of the present invention.

FIG. 1 is a block diagram that illustrates an example of the structure of a main part of an image processing device 1. As illustrated in FIG. 1, the image processing device 1 includes a control unit 11, a storage unit 12, an image input unit 13, and a display unit 14. Although the image processing device 1 may include other members such as an operation unit, a communication unit, a voice input unit, and a voice output unit, those members are not illustrated in the drawings because those members are not related to features of the invention.

The image input unit 13 is an interface that performs interfacing with an external image providing device (not illustrated), and enables the image processing device 1 to acquire an image from the external device. The image providing device may be any type as long as it can provide images, which are stored therein or externally acquired, to or from another device. For example, the image providing device may be a digital camera, a digital video, a digital television, a server, a PC, a mobile phone, a smart phone, a PDA (Personal Digital Assistant), a game machine, or a storage device such as a USB (Universal Serial Bus) memory.

When the image input unit 13 has a wireless communications function or a wired communications function, the image processing device 1 may acquire an image from an image providing device on network. In addition, the image processing device 1 may be equipped with a camera instead of the image input unit 13.

The display unit 14 displays an image according to instructions from the control unit 11. The display unit 14 may be any type as long as it can display an image according to the instructions from the control unit 11. For example, it may be an LCD (liquid crystal display), an organic electro-luminescence display, or a plasma display, etc.

The image processing device 1 may not be equipped with the display unit 14. In this case, the image processing device 1 outputs an image to an external display device in order to display the image on the external display device.

The control unit 11 performs various kinds of operations by executing a program which is read out from the storage unit 12 into a temporary storage unit (not illustrated), and generally controls each unit of the image processing device 1.

In the present embodiment, the control unit 11 includes, as functional blocks, an image acquiring unit (also referred to as an acquiring part) 21, a photographic subject detection unit (also referred to as detection part or photographic subject region identifying part) 22, a background region identifying unit (also referred to as background region identifying part) 23, a sharpness identifying unit (also referred to as sharpness identifying part) 24, a score calculation unit (also referred to as score calculation part) 25, a determination unit (also referred to as determination part) 26, an image output unit (also referred to as storing part) 27, a scene identifying unit (also referred to as scene identifying part) 28, and a threshold identifying unit (also referred to as threshold identifying part) 29. These functional blocks 21 to 29 of the control unit 11 are implemented in a manner that a CPU (central processing unit) reads out a program stored in a storage device implemented as a ROM (read only memory) etc. into a temporary storage unit implemented as a RAM (random access memory) etc., and executes the program.

The image acquiring unit 21 acquires an image from the image providing device via the image input unit 13. The image acquiring unit 21 outputs the acquired image to the photographic subject detection unit 22 and the scene identifying unit 28. When an image is stored in the storage unit 12, the image acquiring unit 21 may read the image from the storage unit 12. Hereinbelow, the image acquired by the image acquiring unit 21 is referred to as an input image.

The photographic subject detection unit 22 acquires the input image from the image acquiring unit 21, detects a predetermined photographic subject from the acquired input image, and identifies a region within which the photographic subject on the input image is included. The classification of the photographic subject which is a target to be detected by the photographic subject detection unit 22 is defined beforehand. For example, it is set up by default or it is specified by the user. Hereinbelow, the region in which the photographic subject to be identified by the photographic subject detection unit 22 is included is referred to as a photographic subject region.

Specifically, the photographic subject detection unit 22 performs photographic subject detection, for example, with respect to a predetermined region (detection region) within the input image, and determines a detection region where the photographic subject is detected as the photographic subject region. The shape of the detection area may be an arbitrary shape, such as a rectangle and a circle. When a photographic subject is detected, the photographic subject detection unit 22 outputs the photographic subject region to the background region identifying unit 23 and the sharpness identifying unit 24, and outputs the classification of the detected photographic subject to the threshold identifying unit 29.

The photographic subject detection unit 22 may detect the photographic subject by executing contour detection (silhouette detection) with respect to the input image, for example. In this case, the photographic subject detection unit 22 identifies the region which is closed by the contour detected through the contour detection as the photographic subject region.

The background region identifying unit 23 identifies the region other than the photographic subject region on the image as the background region when the background region identifying unit 23 acquires the photographic subject region from the photographic subject detection unit 22. The background region identifying unit 23 may identify the region around the photographic subject region on the input image as the background region. The background region identifying unit 23 outputs the identified background region to the sharpness identifying unit 24.

When the sharpness identifying unit 24 acquires the photographic subject region from the photographic subject detection unit 22 and the background region from the background region identifying unit 23, the sharpness identifying unit 24 identifies the sharpness of the acquired photographic subject region and the sharpness of the acquired background region. The sharpness identifying unit 24 outputs the sharpness of the identified photographic subject region and the sharpness of the background region to the score calculation unit 25. Hereinbelow, the sharpness of the photographic subject region is represented by $f(\alpha)$, and the sharpness of the background region is represented by $f(\beta)$.

For example, the sharpness identifying unit 24 may determine the sharpness by existence or absence of a high frequency component in a space spectrum distribution acquired by application of Fast Fourier Transform (refer to Literature Jun Masaki, Hiroshi Kawaguchi, "Research on automation of quality inspection of digital image for printing" Saga Industrial Technology Center Research Report, 2005, No. 14). The sharpness identifying unit 24 may calculate edge intensity within the image, for example, and determine the sharpness with the resulting value (refer to Literature Hiroshi Yokota, "Application of image processing technology-development of portable presentation camera", Tokyo Metropolitan Industrial Technology Research Institute Seminar Abstract, 2009).

The score calculation unit 25 acquires the sharpness of the photographic subject region and the sharpness of the background region from the sharpness identifying unit 24, and calculates a score Sc based on the sharpness of the photographic subject region and the sharpness of the background region. Specifically, the score calculation unit 25 uses the value of a difference between the sharpness $f(\alpha)$ of the photographic subject region and the sharpness $f(\beta)$ of the background region as the score Sc. Here, the score is obtained by $Sc=f(\alpha)-f(\beta)$.

The score calculation unit 25 may calculate the score Sc by multiplying a weighting factor $\gamma$ and the value of the difference between the sharpness $f(\alpha)$ of the photographic subject region and the sharpness $f(\beta)$ of the background region. For example, the weighting factor may be defined by $\gamma=f(\alpha)$. The weighting factor may also be defined by $\gamma=K-f(\beta)$ (K is any integer).

The score calculation unit 25 matches the calculated score Sc with the input image, and outputs them to the determination unit 26. In addition to the score Sc, the score calculation unit 25 may match the sharpness $f(\alpha)$ of the photographic subject region and/or the sharpness $f(\beta)$ of the background region with the input image, and may output them to the determination unit 26.

The determination unit 26 acquires the score Sc from the score calculation unit 25 and determines whether the acquired score Sc is larger than an optimum image threshold Th. The determination unit 26 determines the input image as the optimum image when the score Sc is larger than the optimum image threshold Th, and on the other hand, determines the input image as the non-optimum image when the score Sc is equal to or smaller than the optimum image threshold Th. That is, the determination unit 26 determines, as the optimum image, the input image in which the difference between the sharpness of the photographic subject and the sharpness of the background is sufficiently large.

The determination unit 26 may determine whether the score Sc is larger than the optimum image threshold Th, and may further determine whether the sharpness $f(\alpha)$ of the photographic subject region is still larger than photographic subject threshold Th$\alpha$. In this case, the determination unit 26 determines the input image as the optimum image if Sc is larger than Th, and $f(\alpha)$ is larger than Th$\alpha$, and determines the input image as the non-optimum image if not. That is, the determination unit 26 determines, as the optimum image, the input image in which the difference between the sharpness of the photographic subject and the sharpness of the background is sufficiently large, and in which the sharpness of the photographic subject is large (that is, the image in which the photographic subject is clear).

The determination unit 26 may determine whether the score Sc is larger than the optimum image threshold Th, and may further determine whether the sharpness $f(\beta)$ of the background region is smaller than the background threshold Th$\beta$. In this case, the determination unit 26 determines the input image as the optimum image if Sc is larger than Th and $f(\beta)$ is smaller than Th$\beta$ and determines the input image as the non-optimum image if not. That is, the determination unit 26 determines, as the optimum image, the input image in which the difference between the sharpness of the photographic subject and the sharpness of the background is sufficiently large, and in which the sharpness of the background is small (that is, the background is unclear).

The determination unit 26 may determine whether the score Sc is larger than the optimum image threshold Th, then determine whether the sharpness $f(\alpha)$ of the photographic subject region is larger than photographic subject threshold Th$\alpha$, and finally determine whether the sharpness $f(\beta)$ of the background region is smaller than the background threshold Th$\beta$. In this case, the determination unit 26 determines the input image as the optimum image if Sc is larger than Th, $f(\alpha)$ is larger than Th$\alpha$, and $f(\beta)$ is smaller than Th$\beta$, and determines the input image as the non-optimum image if not. That is, the determination unit 26 determines, as the optimum image, the input image in which the difference between the sharpness of the photographic subject and the sharpness of the background is sufficiently large, the sharpness of the photographic subject is large (the photographic subject is clear), and the sharpness of the background is small (the background is unclear).

When the image acquiring unit 21 acquires a plurality of images, the determination unit 26 may perform ranking with respect to the plurality of input images based on the scores Sc associated with the input images.

The determination unit 26 notifies the image output unit 27 of whether the input image is the optimum image or the non-optimum image. When the image acquiring unit 21 acquires a plurality of images, the determination unit 26 may notify the image output unit 27 of the ranking of each input image as well as a determination result of whether the input image is the optimum image or the non-optimum image.

The optimum image threshold Th, the photographic subject threshold Thα, and the background threshold Thβ are defined beforehand. However, when the determination unit 26 acquires the optimum image threshold Th from the threshold identifying unit 29, the determination unit 26 makes a determination based on the acquired optimum image threshold Th.

The image output unit 27 outputs only the optimum image to the display unit 14 based on the notice from the determination unit 26. The image output unit 27 may distinguish the optimum image from the non-optimum image based on the notice from the determination unit 26 and display them on the display unit 14 as distinguished. The image output unit 27 may display the input images on the display unit 14 in the order of the given rankings, based on the notice from the determination unit 26.

The image output unit 27 may store only the optimum image in the storage unit 12, based on the notice from the determination unit 26. When the image acquiring unit 21 sequentially acquires images, the input images acquired after the input image which is notified as the optimum image may be displayed on the display unit 14 or may be stored in the storage unit 12.

When the determination unit 26 performs ranking with respect to the plurality of input images, the image output unit 27 may display the input images on the display unit 14 in the order of rankings given by the determination unit 26

The scene identifying unit 28 acquires the input image from the image acquiring unit 21 and identifies the scene of the acquired input image. Here, examples of the term "scene" include seashore, snow-covered mountain, evening glow, night view, etc. The scene identifying unit 28 outputs the identified scene to the threshold identifying unit 29.

The threshold identifying unit 29 acquires the classification of the photographic subject from the photographic subject detection unit 22, reads threshold information 42 from the storage unit 12, and identifies the optimum image threshold Th, matched with the classification of the acquired photographic subject, in the threshold information 42. The threshold identifying unit 29 outputs the identified optimum image threshold Th to the determination unit 26.

The threshold identifying unit 29 may acquire the scene from the scene identifying unit 28, reads the threshold information 42 from the storage unit 12, and indentify the optimum image threshold Th, matched with the acquired scene, in the threshold information 42.

The threshold identifying unit 29 may acquire the classification of the photographic subject from the photographic subject detection unit 22 and the scene from the scene identifying unit 28, read the threshold information 42 from the storage unit 12, and identify the optimum image threshold Th, matched with a combination of the classification of the photographic subject and the scene which are acquired, in the threshold information 42. That is, threshold identifying unit 29 can set the optimum image threshold Th according to the photographic subject and/or the scene.

The threshold identifying unit 29 may acquire the classification of the photographic subject from the photographic subject detection unit 22, read the threshold information 42 from the storage unit 12, and identify the photographic subject threshold Thα, matched with the acquired classification of the photographic subject, in the threshold information 42.

The storage unit 12 stores a program, data, etc. referred to by the control unit 11. For example, the storage unit 12 stores the input images, image data 41 as the optimum image, and the threshold information 42.

The threshold information 42 stored in the storage unit 12 is described with reference to FIGS. 2 to 4. FIGS. 2 to 4 are diagrams illustrating examples of the threshold information 42 stored in the storage unit 12.

In the threshold information 42 shown in FIG. 2, photographic subjects and optimum image thresholds corresponding to the photographic subjects are matched. In the threshold information 42 shown in FIG. 3, scenes and optimum image thresholds corresponding to the scenes are matched. In the threshold information 42 shown in FIG. 4, combinations of photographic subjects and scenes, and optimum image thresholds corresponding to the combinations are matched.

Image Selection Process

Embodiment 1

Figure 5:
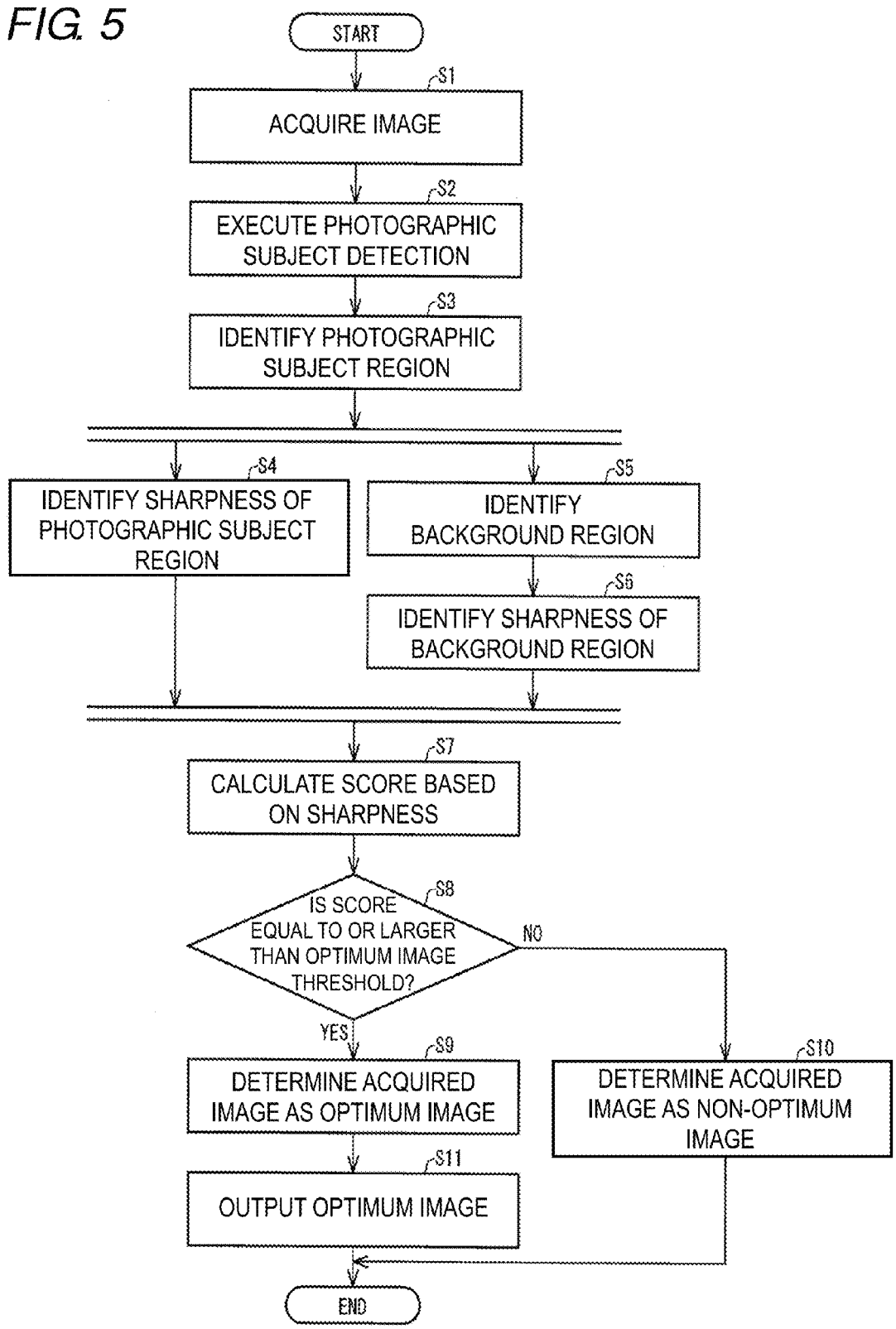
FIG. 5 is a flowchart illustrating an example of an image selection process of selecting an optimum image, which is executed by the image processing device.

Next, an example (Embodiment 1) of an image selection process of selecting an optimum image, which is executed by the image processing device 1, is described with reference to FIG. 5. FIG. 5 is a flowchart illustrating an example of the image selection process of selecting an optimum image, which is executed by the image processing device 1.

As shown in FIG. 5, first, an image acquiring unit 21 acquires an image from an external image providing device via an image input unit 13 (Step S1). When the image has been acquired by the image acquiring unit 21, a photographic subject detection unit 22 executes photographic subject detection with respect to the input image (Step S2). Subsequently, the photographic subject detection unit 22 identifies a photographic subject region, including a photographic subject detected, on the input image (Step S3).

When the photographic subject region has been identified by the photographic subject detection unit 22, a sharpness identifying unit 24 identifies sharpness of the photographic subject region (Step S4). In parallel with this, a background region identifying unit 23 identifies a region other than the photographic subject region, on the input image, as a background region (Step S5). Subsequently, a sharpness identifying unit 24 identifies sharpness of the background region (Step S6).

When the sharpness of the photographic subject region and the sharpness of the background region have been identified by the sharpness identifying unit 24, a score calculation unit 25 calculates a score based on the sharpness of the photographic subject region and the sharpness of the background region (Step S7).

When the score has been calculated by the score calculation unit 25, a determination unit 26 determines whether the score is larger than the optimum image threshold (Step S8). When the score is larger than the optimum image threshold (YES in Step S8), the determination unit 26 determines the input image as the optimum image (Step S9). When the score is equal to or smaller than the optimum image threshold (NO in Step S8), the determination unit 26 determines the input image as the non-optimum image (Step S10). Subsequently, an image output unit 27 displays only the optimum image on the display unit 14 (Step S11).

Embodiment 2

Figure 6:
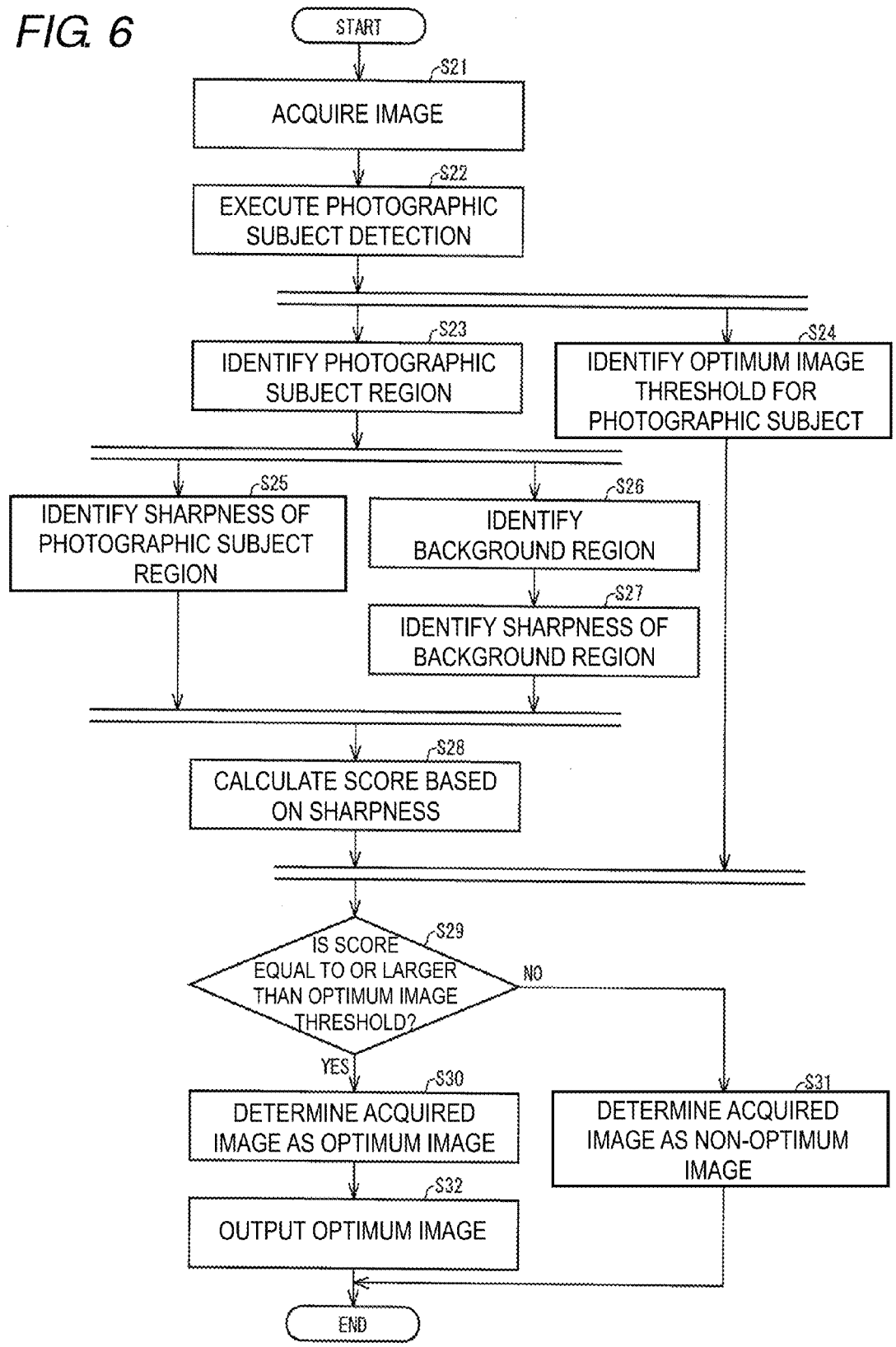
FIG. 6 is a flowchart illustrating another example of the image selection process of selecting an optimum image, which is executed by the image processing device.

Next, another example (Embodiment 2) of the image selection process of selecting an optimum image, which is executed by the image processing device 1, is described with reference to FIG. 6. FIG. 6 is a flowchart illustrating another example of the image selection process of selecting the optimum image, which is executed by the image processing device 1.

Here, a determination unit 26 uses an optimum image threshold for a photographic subject.

As illustrated in FIG. 6, first, an image acquiring unit 21 acquires an image from an external image providing device via an image input unit 13 (Step S21). When the image has been acquired by the image acquiring unit 21, a photographic subject detection unit 22 executes photographic subject detection with respect to the input image (Step S22). Subsequently, the photographic subject detection unit 22 identifies a photographic subject region, including a photographic subject detected, on the input image (Step S23). In parallel to this, a threshold identifying unit 29 identifies an optimum image threshold matched with a photographic subject that the photographic subject detection unit 22 has detected by referring to threshold information 42 (Step S24).

When a photographic subject region has been identified by the photographic subject detection unit 22, a sharpness identifying unit 24 identifies sharpness of the photographic subject region (Step S25). In parallel with this, a background region identifying unit 23 identifies a region, other than the photographic subject region, on the input image as a background region (Step S26). Subsequently, the sharpness identifying unit 24 identifies sharpness of the background region (Step S27).

When the sharpness of the photographic subject region and the sharpness of the background region have been identified by the sharpness identifying unit 24, a score calculation unit 25 calculates a score based on the sharpness of the photographic subject region and the sharpness of the background region (Step S28).

When the score has been calculated by the score calculation unit 25 and the optimum image threshold for the photographic subject has been identified by the threshold identifying unit 29, a determination unit 26 determines whether the score is larger than the optimum image threshold identified by the threshold identifying unit 29 (Step S29). When the score is larger than the optimum image threshold (YES in Step S29), the determination unit 26 determines the input image as the optimum image (Step S30). When the score is equal to or smaller than the optimum image threshold (NO in Step S29, the determination unit 26 determines the input image as a non-optimum image (Step S31). Subsequently, an image output unit 27 displays only the optimum image on a display unit 14 (Step S32).

Embodiment 3

Figure 7:
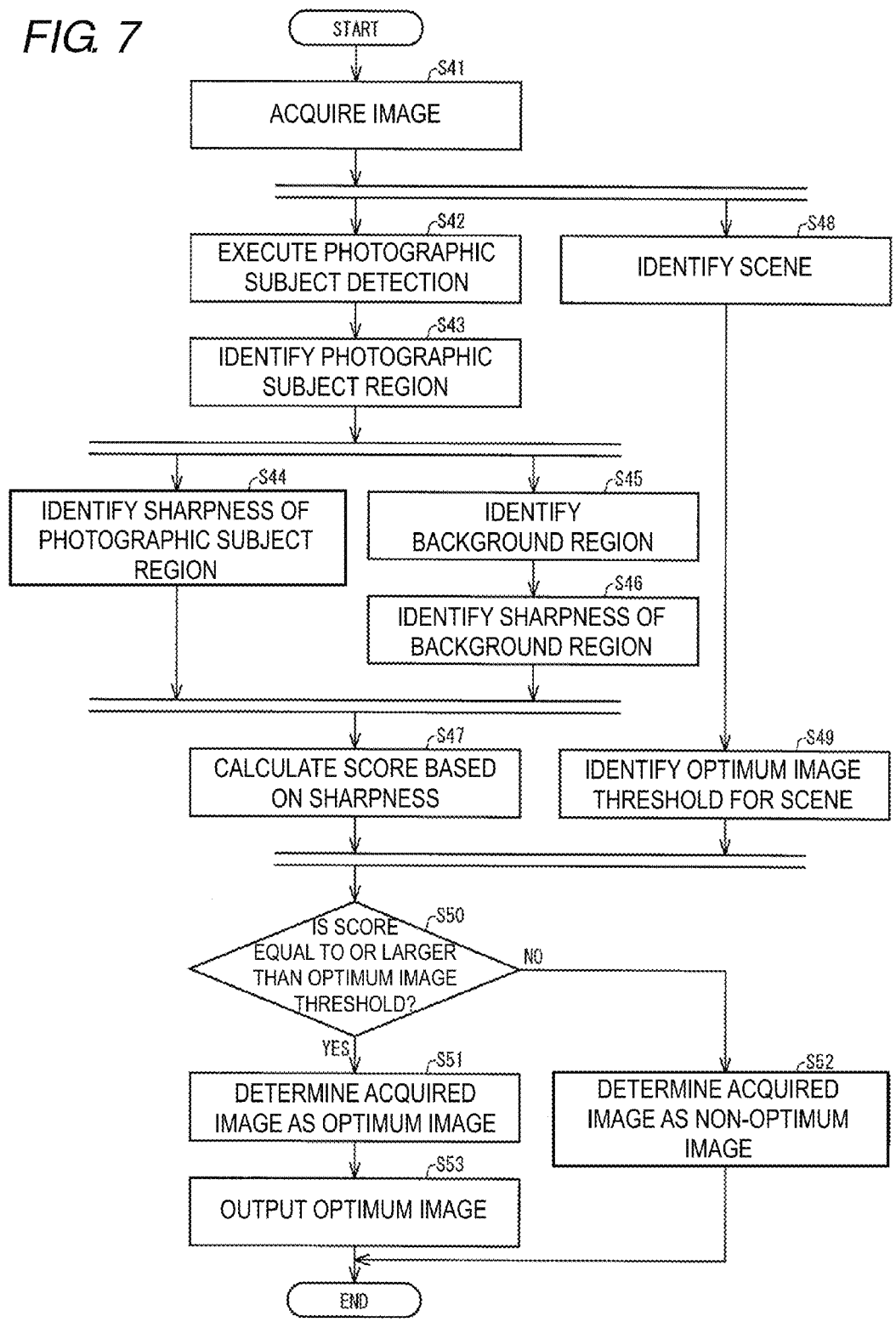
FIG. 7 is a flowchart illustrating still another example of the image selection process of selecting an optimum image, which is executed by the image processing device.

Next, still another example (Embodiment 3) of the image selection process of selecting an optimum image, which is executed by the image processing device 1, is described with reference to FIG. 7. FIG. 7 is a flowchart illustrating still another example of the image selection process of selecting the optimum image, which is executed by the image processing device 1.

Here, a determination unit 26 uses an optimum image threshold for a scene.

As illustrated in FIG. 7, first, an image acquiring unit 21 acquires an image from an external image providing device via an image input unit 13 (Step S41). When the image has been acquired by the image acquiring unit 21, a photographic subject detection unit 22 executes photographic subject detection with respect to the input image (Step S42). Subsequently, a photographic subject detection unit 22 identifies a photographic subject region, including a photographic subject detected, on the input image (Step S43).

When the photographic subject region has been identified by the photographic subject detection unit 22, a sharpness identifying unit 24 identifies sharpness of the photographic subject region (Step S44). In parallel with this, a background region identifying unit 23 identifies a region other than the photographic subject region on the input image as a background region (Step S45). Subsequently, the sharpness identifying unit 24 identifies sharpness of the background region (Step S46).

When the sharpness of the photographic subject region and the sharpness of the background region have been identified by the sharpness identifying unit 24, a score calculation unit 25 calculates a score based on the sharpness of the photographic subject region and the sharpness of the background region (Step S47).

When the image has been acquired by the image acquiring unit 21, in parallel with processing of Step S42, a scene identifying unit 28 identifies scene of the input image (Step S48). In parallel with this, a threshold identifying unit 29 identifies an optimum image threshold matched with the scene that the scene identifying unit 28 has identified by referring to threshold information 42 (Step S49).

When the score has been calculated by the score calculation unit 25 and the optimum image threshold for the scene has been identified by the threshold identifying unit 29, a determination unit 26 determines whether the score is larger than the optimum image threshold identified by the threshold identifying unit 29 (Step S50). When the score is larger than the optimum image threshold (YES in Step S50), the determination unit 26 determines the input image as the optimum image (Step S51). When the score is equal to or smaller than the optimum image threshold (NO in Step S50), the determination unit 26 determines the input image as a non-optimum image (Step S52). Subsequently, an image output unit 27 displays only the optimum image on a display unit 14 (Step S53).

Embodiment 4

Figure 8:
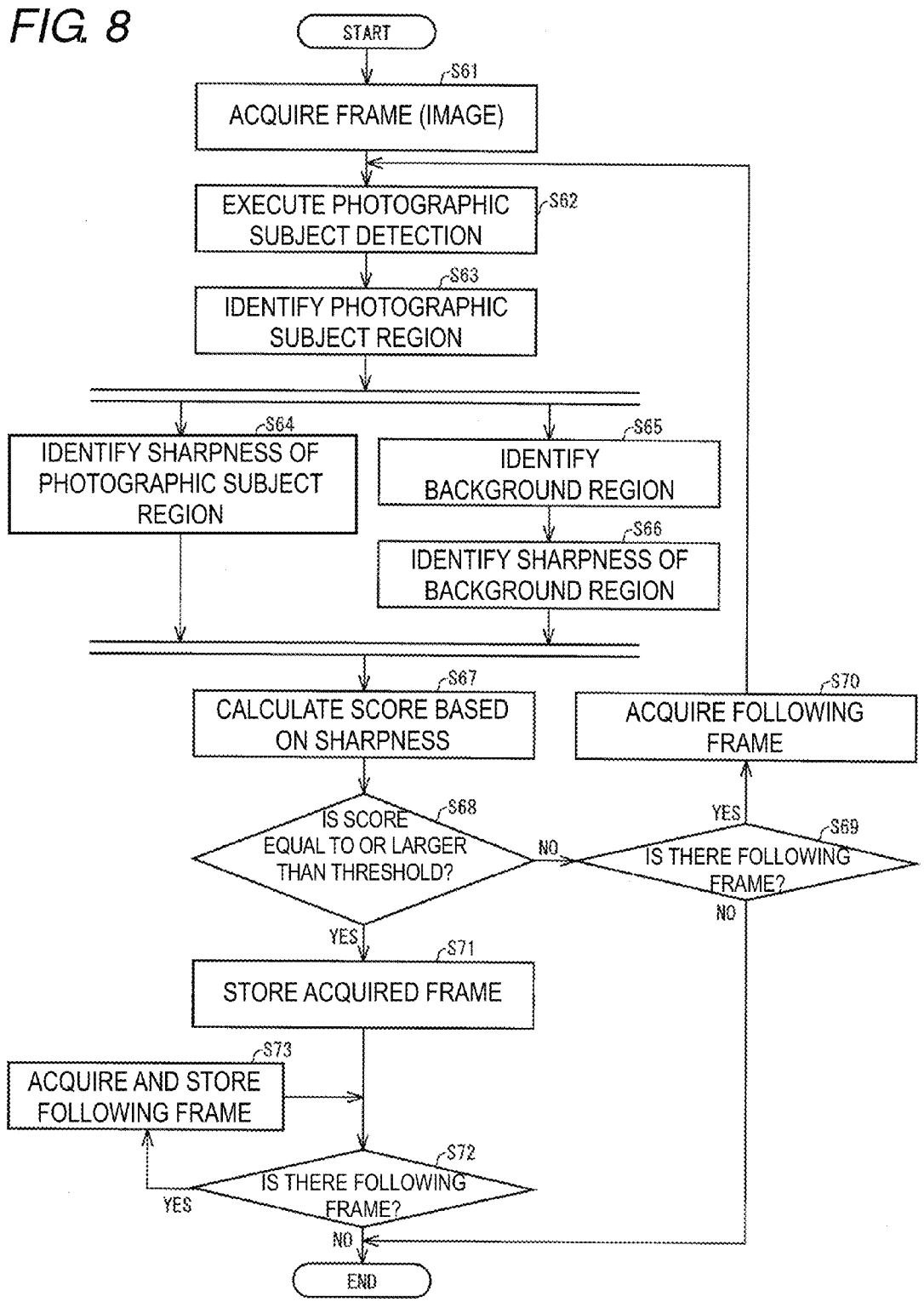
FIG. 8 is a flowchart illustrating yet another example of the image selection process of selecting an optimum image, which is executed by the image processing device.

Next, yet another example (Embodiment 4) of the image selection process of selecting an optimum image, which is executed by the image processing device 1, is described with reference to FIG. 8. FIG. 8 is a flowchart illustrating yet another example of the image selection process of selecting the optimum image, which is executed by the image processing device 1.

Figure 9:
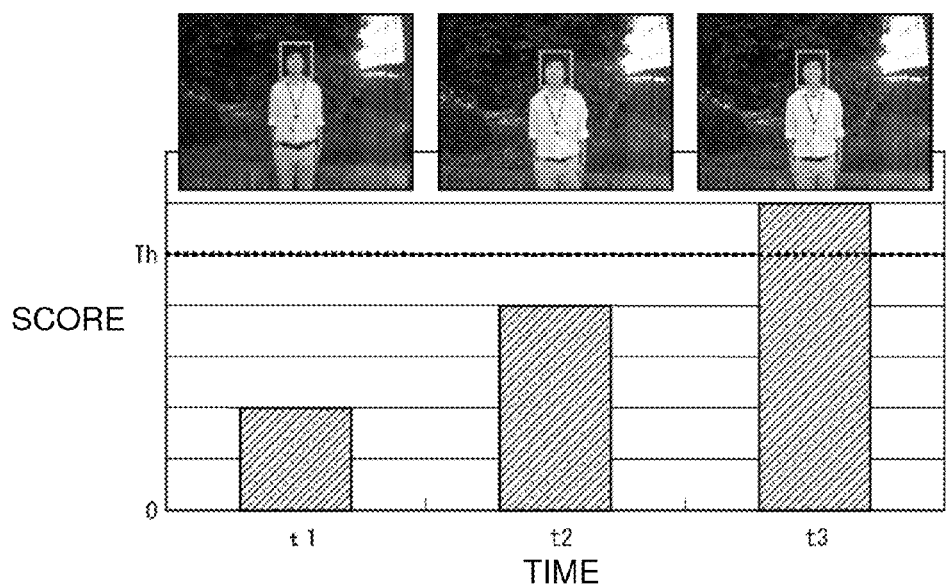
FIG. 9 is a diagram illustrating record timing at the time of moving image shooting.

Here, an external image providing device is a camera and it is assumed that the camera is imaging a moving image. It is assumed that an image acquiring unit 21 sequentially acquires frames of the moving image from the camera and an image output unit 27 stores frames subsequent to the frame of an optimum image in a storage unit 12. For example, as illustrated in FIG. 9, the moving image is recorded after the moving image is imaged and a score of the frame exceeds an optimum image threshold.

As illustrated in FIG. 8, first, the image acquiring unit 21 acquires a frame (image) from the camera via an image input unit 13 (Step S61). When the image has been acquired by the image acquiring unit 21, a photographic subject detection unit 22 executes photographic subject detection with respect to the input image (Step S62). Subsequently, a photographic subject detection unit 22 identifies a photographic subject region including a photographic subject detected from the input image (Step S63).

When the photographic subject region has been identified by the photographic subject detection unit 22, a sharpness identifying unit 24 identifies sharpness of the photographic subject region (Step S64). In parallel with this, a background region identifying unit 23 identifies a region other than the photographic subject region on the input image as a background region (Step S65). Subsequently, the sharpness identifying unit 24 identifies sharpness of the background region (Step S66).

When the sharpness of the photographic subject region and the sharpness of the background region have been identified by the sharpness identifying unit 24, a score calculation unit 25 calculates a score based on the sharpness of the photographic subject region and the sharpness of the background region (Step S67).

When the score has been calculated by the score calculation unit 25, a determination unit 26 determines whether the score is larger than an optimum image threshold (Step S68). Here, when the score is equal to or smaller than the optimum image threshold (NO in Step S68), whether the following frame is being output from the camera is determined, that is, whether the camera is continuously imaging the moving image is determined (Step S69). When there is the following frame (YES in Step S69), the image acquiring unit 21 acquires the following frame from the camera via the image input unit 13 (Step S70) and performs processing of Steps S62 to S68. On the other hand, if there is no following frame (NO in Step S69), the image selection process is ended.

In Step S68, when the score is larger than the optimum image threshold (YES in Step S68), a determination unit 26 determines the image as an optimum image and an image output unit 27 stores the input image, which is the optimum image, in a storage unit 12 (Step S71). Subsequently, whether the following frame is being output from the camera, that is, whether the camera is continuously imaging the moving image is determined (Step S72). When there is the following frame (YES in Step S72), the image acquiring unit 21 acquires the following frame from the camera via the image input unit 13, and the image output unit 27 stores the input image acquired by the image acquiring unit 21 in the storage unit 12 (Step S73). The image (moving image) which is imaged is recorded until the imaging of the moving image is finished. When the imaging is finished (No in Step S72), the image selection process is ended.

Although the frames subsequent to the frame which is determined as the optimum image are recorded in the present embodiment, only the frame which is determined as the optimum image may be recorded.

[Regarding Region Identification Process]

Figure 10:
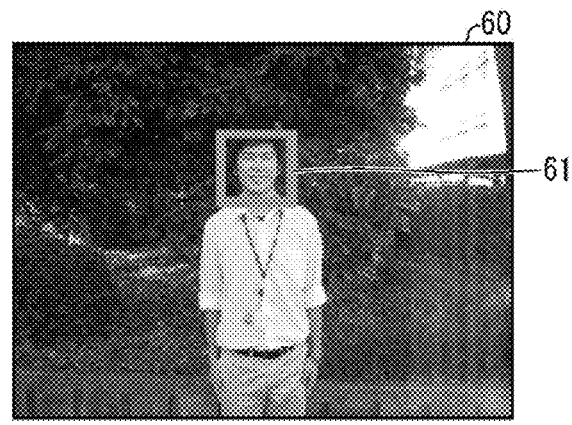
FIG. 10 is a diagram illustrating a result of face detection executed with respect to an input image.
Figure 11:
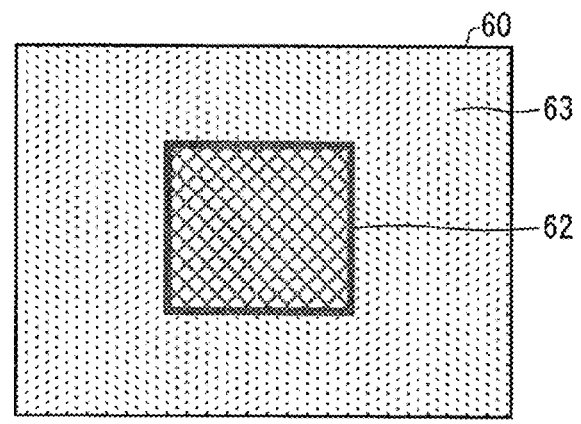
FIG. 11 is a diagram illustrating a photographic subject region and a background region identified through the face detection.

A photographic subject region identification process and a background region identification process are described in detail with reference to FIGS. 10 to 13. First, a case where the photographic subject detection unit 22 performs face detection with respect to an input image is described with reference to FIGS. 10 and 11. FIG. 10 is a diagram illustrating a result of the face detection executed with respect to the input image. FIG. 11 is a diagram illustrating a photographic subject region and a background region identified through the face detection.

In this case, as illustrated in FIG. 10, the photographic subject detection unit 22 performs face detection to an input image 60, and a human being's face 61 as a photographic subject is detected. As illustrated in FIG. 11, the photographic subject detection unit 22 identifies a region including the human being's face 61 which is detected, based on the result of the face detection, as a photographic subject region 62. The background region identifying unit 23 identifies a region, other than the photographic subject region 62, on the input image 60 as a background region 63.

Figure 12:
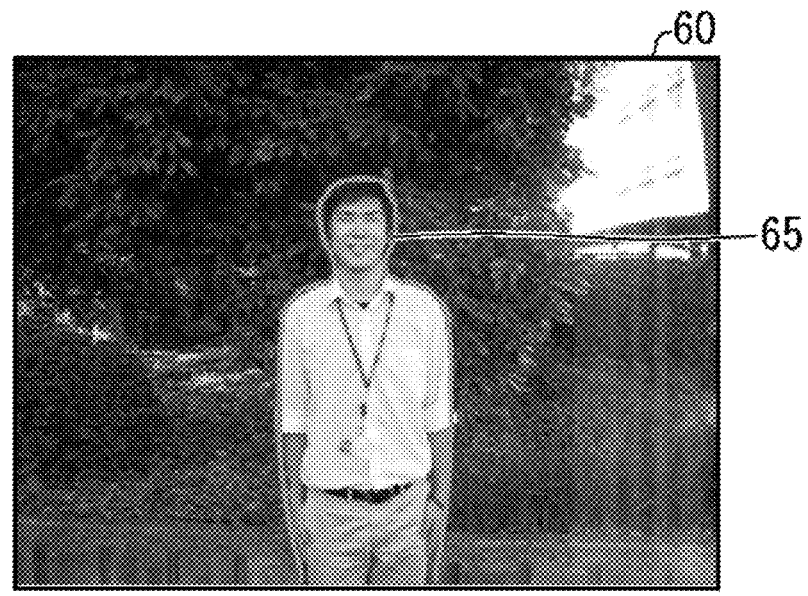
FIG. 12 is a diagram illustrating a result of contour detection executed with respect to an input image.
Figure 13:
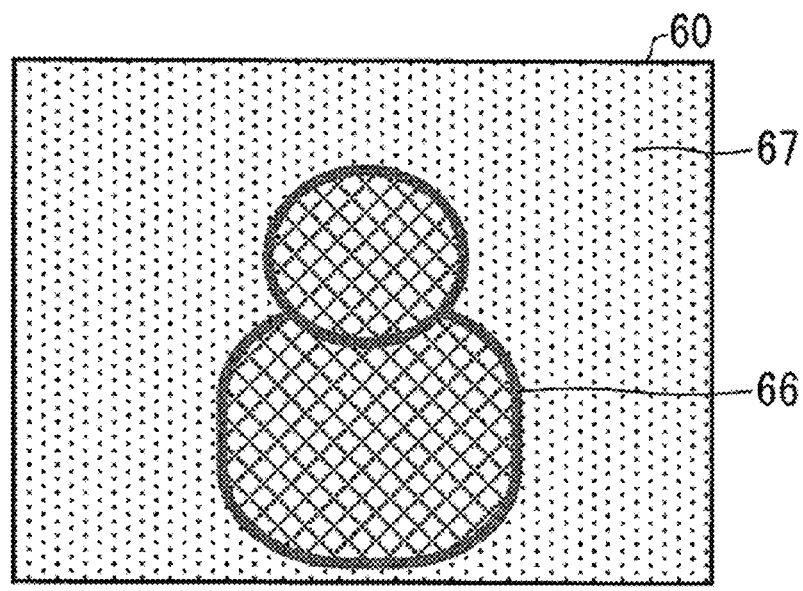
FIG. 13 is a diagram illustrating a photographic subject region and a background region identified through the contour detection.

Next, a case where the photographic subject detection unit 22 performs contour detection with respect to an input image is described with reference to FIGS. 12 and 13. FIG. 12 is a diagram illustrating a result of contour detection which is executed with respect to the input image. FIG. 13 is a diagram illustrating a photographic subject region and a background region identified through the contour detection.

In this case, as illustrated in FIG. 12, the photographic subject detection unit 22 executes the contour detection with respect to the input image 60 and a human being's contour 65 as a photographic subject is detected. As illustrated in FIG. 11, the photographic subject detection unit 22 identifies a region closed by the human being's contour 65 which is detected, based on the result of the contour detection, as a photographic subject region 66. The background region identifying unit 23 identifies a region, other than the photographic subject region 66, on the input image 60 as a background region 67.

[Regarding Weighting Score Calculation]

Next, a specific example of a weighting score calculation of the score calculation unit 25 is described with reference to FIG. 14. In the weighting score calculation, the score is calculated by multiplying a weighting factor $\gamma$ and a value of the difference between sharpness $f(\alpha)$ of the photographic subject region and sharpness $f(\beta)$ of the background region. FIG. 14 is a diagram illustrating an example of a weighting score calculation method.

Herein, scores for 5 input images A to E are assumed to be calculated. Herein, $f(\alpha)$ and $f(\beta)$ of the input image A are 750 and 210, respectively; $f(\alpha)$ and $f(\beta)$ of the input image B are 1000 and 550, respectively; $f(\alpha)$ and $f(\beta)$ of the input image C are 600 and 110, respectively; $f(\alpha)$ and $f(\beta)$ of the input image D are 900 and 850, respectively; and $f(\alpha)$ and $f(\beta)$ of the input image E are 100 and 50, respectively.

First, for the score calculation method, a case where a weighting factor $\gamma$ is 1, $\gamma=1$, is considered. In this case, as illustrated in FIG. 14, the scores of the input images A to E are 540, 450, 490, 50, and 50, respectively. In this case, when the determination unit 26 performs ranking with respect to the input images A to E, based on the scores, the order of rankings becomes A, C, B, D, and E.

Next, for the score calculation method, a case where the weighting factor $\gamma$ is $f(\alpha)$, $\gamma=f(\alpha)$, s considered. In this case, as illustrated in FIG. 14, the scores of the input images A to E are 405000, 450000, 294000, 45000, and 5000, respectively. In this case, when the determination unit 26 performs ranking with respect to the input images A to E, based on the scores, the order of rankings becomes B, A, C, D, and E.

In this case, in regard to the weighting factor, the value of the factor increases as the sharpness of the photographic subject region increases. Accordingly, the input image in which the sharpness of the photographic subject region is relatively high and the photographic subject region is clear has a high score.

Finally, for the score calculation method, a case where the weighting factor $\gamma$ is $1000-f(\beta)$, $\gamma=1000-f(\beta)$, is considered. In this case, as illustrated in FIG. 14, the scores of the input images A to E are 426600, 202500, 436100, 7500, and 47500, respectively. In this case, when the determination unit 26 performs ranking with respect to the input images A to E, based on the scores, the order of rankings becomes C, A, B, E, and D.

In this case, in regard to the weighting factor, the value of the factor increases as the sharpness of the background region decreases. Accordingly, the input image in which the sharpness of the photographic subject region is relatively high and the background region is high has a high score.

[Regarding Sharpness and Score]

In the present embodiment, when the sharpness takes a positive value, the larger the value, the clearer the image (region). From a different viewpoint, it can be said that the smaller the value, the unclearer the image (region). The sharpness may take positive and negative values. In this case, the sharpness of a predetermined reference image (standard image) may be set to "0". In addition, as the absolute value of the positive value increases, the image is clearer than the reference image. On the other hand, as the absolute value of the negative value increases, the image is less clear than the reference image.

In the present embodiment, when the score is defined as $Sc=f(\alpha)-f(\beta)$ and the score takes positive and negative values, as the value of the score increases, the photographic subject region is relatively clearer than the background region. As the value of the score decreases, the photographic subject region is relatively less clear than the background region. However, the invention may not be limited to this. The score may be defined as $Sc=f(\beta)-f(\alpha)$. In this case, as the value of the score increases, the photographic subject region is relatively less clear than the background region. That is, as the value of the score decreases, the photographic subjection region is relatively clearer than the background region.

In the present invention, the sharpness and score are measured to be used to determine whether the photographic subject region is relatively clear compared with the background region. When it is put in another way, as long as it is possible to determine whether the photographic subject region is relatively clear compared with the background region, the definitions of the sharpness and score may be set arbitrarily. That is, the definitions of the sharpness and score may be suitably set within the scope of the object of the present invention.

[Modification 1]

Figure 15:
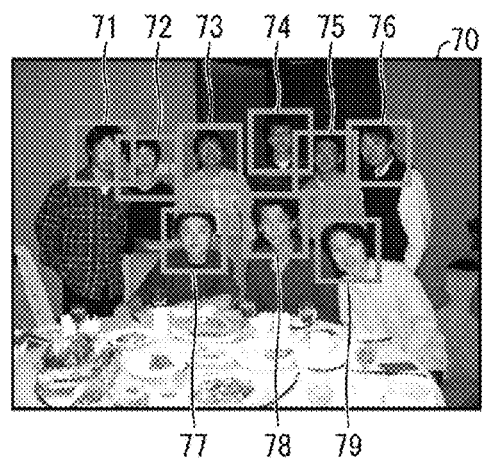
FIG. 15 is a diagram illustrating an example of an input image which includes multiple photographic subjects.
Figures 16A, 16B:
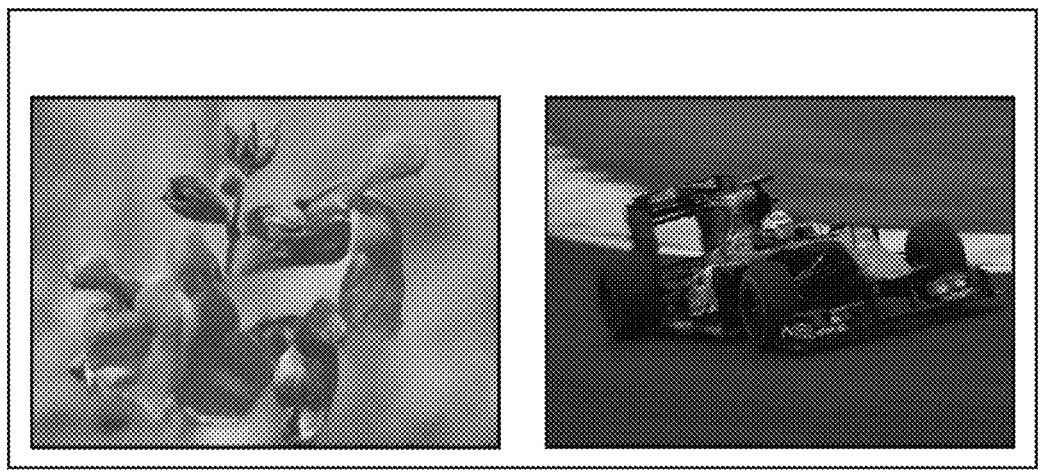
FIGS. 16A and 16B are diagrams each illustrating an example of an image in which sharpness of a photographic subject is relatively high compared with sharpness of a background.
Figures 17A, 17B:
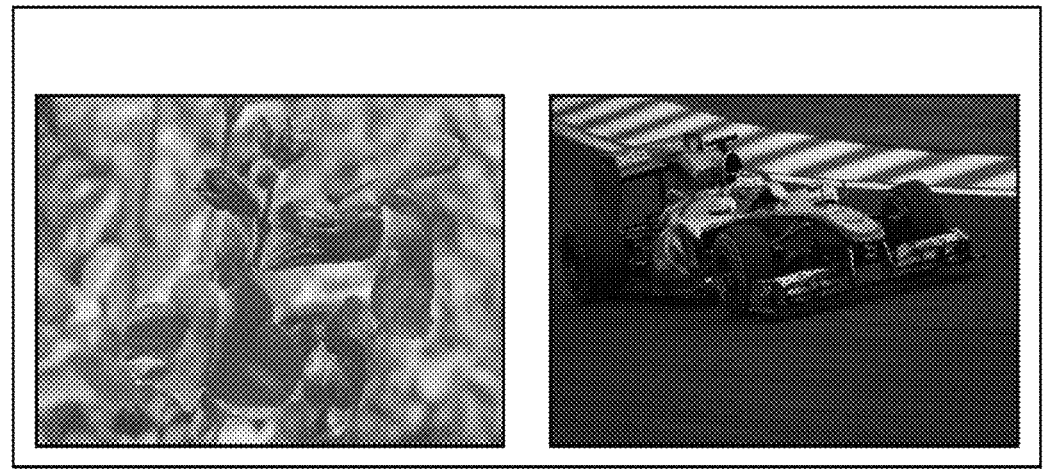
FIGS. 17A and 17B are diagrams each illustrating an example of an image in which sharpness of a photographic subject is relatively low compared with sharpness of a background.

As illustrated in FIG. 15, a case where a plurality of photographic subjects are included in one input image is described. FIG. 15 is a diagram illustrating an example of an input image which includes a plurality of photographic subjects.

A photographic subject detection unit 22 performs face detection with respect to an input image 70, and detects nine photographic subjects. In this case, the photographic subject detection unit 22 identifies nine photographic subject regions 71 to 79, based on a detection result. Subsequently, a background region identifying unit 23 identifies nine background regions for the photographic subject regions 71 to 79. Subsequently, a sharpness identifying unit 24 identifies sharpness $f(\alpha_1)$ to sharpness $f(\alpha_9)$ of the photographic subject regions, and sharpnesses $f(\beta_1)$ to $f(\beta_9)$ of the background regions.

Here, a score calculation unit 25 may calculate an average of nine differential values as a score Sc. That is, the score may be defined as $Sc=(f(h_1)+f(h_2)+ \ldots +f(h_9))/9$. In addition, $f(h)=f(\alpha)-f(\beta)$.

The score calculation unit 25 may calculate nine scores $Sc_1$ to $Sc_9$. When calculating the nine scores $Sc_1$ to $Sc_9$, a determination unit 26 may determine the input image as an optimum image when all of the scores $Sc_1$ to $Sc_9$ are larger than an optimum image threshold. Alternatively, the determination unit 26 may determine the input image as the optimum image when any of the scores $Sc_1$ to $Sc_9$ is larger than the optimum image threshold.

Alternatively, the score calculation unit 25 may calculate the average of the sharpness $f(\alpha_1)$ to the sharpness $f(\alpha_9)$ of the photographic subject regions and compare the average with a photographic subject threshold Th$\alpha$. Yet alternatively, the determination unit 26 may compare each sharpness, from $f(\alpha_1)$ to $f(\alpha_9)$, with the photographic subject threshold Th$\alpha$. Yet alternatively, the score calculation unit 25 may calculate the average of from the sharpness $f(\beta_1)$ to the sharpness $f(\beta_9)$ of the background regions and compare the average with a background threshold Th$\beta$. Yet alternatively, the determination unit 26 may compare each sharpness, from $f(\beta_1)$ to $f(\beta_9)$, with the background threshold Th$\beta$.

[Supplement]

The present invention is not limited to the embodiments described above but may be modified within the scope defined by claims. That is, embodiments that are obtained by combining technical means which are suitably changed within the scope defined by the claims will also fall within the technical scope of the invention.

Lastly, each block of the image processing device 1, especially the control unit 11, may be constructed by hardware logic, or may be achieved by software by using a CPU as follows.

Namely, the image processing device 1 includes a CPU (Central Processing Unit) which executes commands of a control program which implements each function, a ROM (Read Only Memory) in which the program is stored, a RAM (Random Access Memory) into which the program is developed, a storage device (recording medium) such as a memory in which the program and various data are stored, etc. The object of the present invention also can be achieved in a manner that a recording medium in which program codes (executable program, intermediate code program, source program) of control programs of the image processing device 1, which are software to execute the above functions, are recorded in a computer-readable manner is provided in the image processing device 1 and that a computer (or CPU or MPU) reads and executes the program codes recorded in the recording medium.

As the recording medium, for example, a tape system such as a magnetic tape/cassette tape, a disk system including magnetic disks such as a floppy (registered trademark) disk/hard disk and optical discs such as a CD-ROM/MO/MD/DVD/CD-R, a card system such as an IC card (including a memory card)/optical card, a semiconductor memory system such as a mask ROM/EPROM/EEPROM (registered trademark)/flash ROM, etc. may be used.

The image processing device 1 may be configured to be connectable to a communication network and the program code may be supplied via the communication network. The communication network is not limited to a specific one. For example, Internet, INTRANET, EXTRANET, LAN, ISDN, VAN, a CATV communication network, a virtual private network, a telephone network, a mobile communication network, a satellite communication network, etc may be used as the communication network. For a transmission medium which constitutes the communication network, there are no specific limitations. For example, a cable medium such as IEEE1394, USB, a Power Line Carrier (PLC), a cable TV circuit, a telephone cable, and an ADSL circuit; or a wireless medium such as an infrared-rays medium such as IrDA and a remote control, Bluetooth (registered trademark), 802.11 wireless networks, HDR, a portable telephone network, a satellite channel, and a terrestrial digital network may be used. The present invention may be implemented in the form of computer data signals carried on carrier waves which are embodied by electronic transmission of the program code.

The present invention can be used for an image processing device which selects an image that a user wants to obtain.

More information on embodiments of the invention are provided as follows. In accordance with one aspect of at least one embodiment of the present invention, there is provided an image processing device for selecting an image, the image processing device includes: a detection part configured to detect a predetermined photographic subject from an image; a photographic subject region identifying part configured to identify a photographic subject region that is a region on the image, the region including the predetermined photographic subject detected by the detection part; a background region identifying part configured to identify a background region that is a region on the image, the region being other than the photographic subject region identified by the photographic subject region identifying part; a sharpness identifying part configured to identify sharpness of the photographic subject region and sharpness of the background region; a score calculation part configured to calculate a score, based on a difference in the sharpness between the photographic subject region and the background region; and a determination part that determines the image as an optimum image when the score calculated by the score calculation part is compared with an optimum image threshold and the score indicates that the photographic subject region is clearer than the background region.

In accordance with another aspect of at least one embodiment of the present invention, there is provided an image processing method for selecting an image, the image processing method includes: detecting a predetermined photographic subject from an image; identifying a photographic subject region that is a region on the image, the region including the predetermined photographic subject detected in the detecting; identifying a background region that is a region on the image, the region being other than the photographic subject region identified in the identifying of the photographic subject region; identifying sharpness of the photographic subject region and sharpness of the background region; calculating a score, based on a difference in the sharpness between the photographic subject region and the background region; and determining the image as an optimum image when the score calculated in the calculating is compared with an optimum image threshold and the score indicates that the photographic subject region is clearer than the background region.

According to an embodiment of the present invention, preferably the determination part determine the optimum image when a score obtained based on a difference in the sharpness between the photographic subject region and the background region indicates that the photographic subject region is clearer than the background region. Here, the optimum image may be an image having a large difference in the sharpness between the photographic subject region and the background region. In other words, the optimum image is an image in which the sharpness of the photographic subject region is relatively high compared with the sharpness of the background region.

Accordingly, the image processing device has an advantage of being capable of selecting an image in which the sharpness of the photographic subject is relatively high compared with the sharpness of the background.

In accordance with another embodiment of the present invention, preferably, the determination part further determines whether the photographic subject region is clear by comparing the sharpness of the photographic subject region and a photographic subject threshold and the image is determined as the optimum image when the score is compared with the optimum image threshold and the score indicates that the photographic subject region is clearer than the background region, and when the sharpness of the photographic subject region is compared with the photographic subject threshold and it is determined that the photographic subject region is clear.

According to the embodiment, the determination part determines the image as the optimum image when the score indicates that the photographic subject region is clearer than the background region and the photographic subject region is determined to be clear. That is, in this case, the optimum image is an image in which the sharpness of the photographic subject region is relatively high compared with the sharpness of the background region and the sharpness of the photographic subject region is high.

Accordingly, the image processing device can select an image in which the sharpness of the photographic subject is relatively high as compared with the sharpness of the background and the sharpness of the photographic subject is high.

In the image processing device according to at least one embodiment of the present invention, preferably, the determination part further determines whether the background region is clear by comparing the sharpness of the background region and a background threshold and the image is determined as the optimum image when the score is compared with the optimum image threshold and the score indicates that the photographic subject region is clearer than the background region, and when the sharpness of the background region is compared with the background threshold and it is determined that the background region is not clear.

According to the embodiment, the determination part determines the image as the optimum image when the photographic subject region is indicated to be clearer than the background region and the background region is determined to be not clear. That is, in this case, the optimum image is an image in which the sharpness of the photographic subject region is relatively high compared with the sharpness of the background region and the sharpness of the background region is low.

Accordingly, the image processing device can select an image in which the sharpness of a photographic subject is relatively high as compared with the sharpness of a background and the background is not clear.

In the image processing device according to at least one embodiment of the present invention, preferably, the determination part further determines whether the photographic subject region is clear by comparing the sharpness of the photographic subject region and a photographic subject threshold and determines whether the background region is clear by comparing the sharpness of the background region and a background threshold and the image is determined as the optimum image when the score is compared with the optimum image threshold and the score indicates that the photographic subject region is clearer than the background region, when the sharpness of the photographic subject region is compared with the photographic subject threshold and the photographic subject region is determined to be clear, and when the sharpness of the background region is compared with the background threshold and the background region is determined to be not clear.

According to the embodiment, the determination part determines the image as the optimum image when the score indicates that the photographic subject region is clearer than the background region, the photographic subject region is determined to be clear, and the background region is determined to be not clear. That is, in this case, the optimum image is an image in which the sharpness of the photographic subject region is relatively high compared with the sharpness of the background region, the sharpness of the photographic subject region is high, and the sharpness of the background region is low.

Accordingly, the image processing device can select an image in which the sharpness of the photographic subject is relatively high as compared with the sharpness of the background, the photographic subject is clear, and the background is not clear.

Preferably, the image processing device according to at least one embodiment of the present invention further includes a threshold identifying part configured to identify the optimum image threshold according to the photographic subject detected by the detection part, in which the determination part compares the optimum image threshold identified by the threshold identifying part and the score.

According to the embodiment, the determination part compares the optimum image threshold for the photographic subject, which is identified by the threshold identifying part, and the score. Therefore, the relative sharpness of the photographic subject can be determined according to the photographic subject in the optimum image.

Preferably, the image processing device according to at least one embodiment of the present invention further includes a scene identifying part configured to identify a scene of the image, and a threshold identifying part configured to identify the optimum image threshold according to the scene, in which the determination part compares the score and the optimum image threshold identified by the threshold identifying part.

According to the embodiment, the determination part compares the score and the optimum image threshold, which is identified by the threshold identifying part according to the scene. Therefore, the relative sharpness of the photographic subject in the optimum image can be determined according to the scene.

In the image processing device according to at least one embodiment of the present invention, it is preferable that when the detection part detects a plurality of photographic subjects from an image, the score calculation part calculates a score for each photographic subject, and the determination part determines the image as the optimum image when an average of the scores is compared with the optimum image threshold and the average of the scores indicates that most of the photographic subject regions of the plurality of photographic subjects are clearer than the background region.

In the image processing device according to at least one embodiment of the present invention, it is preferable that when the detection part detects a plurality of photographic subjects from an image, the score calculation part calculates a score for each photographic subject, and the determination part determines the image as the optimum image when each score is compared with the optimum image threshold and all of the scores indicate that the photographic subject region is clearer than the background region.

In the image processing device according to at least one embodiment of the present invention, it is preferable that when the detection part detects a plurality of photographic subjects from an image, the score calculation part calculates a score for each photographic subject, and the determination part determines the image as the optimum image when each score is compared with the optimum image threshold and any of the scores indicates that the photographic subject region is clearer than the background region.

In the image processing device according to the present invention, it is preferable that the image includes a plurality of images, and the determination part performs ranking with respect to the plurality of images, based on the score for each image.

According to the embodiment, the determination part performs ranking with respect to the plurality of images, based on the scores. Therefore, superiority or inferiority can be attached to the image, based on a criterion which is relative sharpness of the photographic subject.

In the image processing device according to at least one embodiment of the present invention, preferably, the score calculation part calculates the score by multiplying a weighting factor and a difference in sharpness between the photographic subject region and the background region.

According to the embodiment, the score calculation part calculates the score by multiplying a weighting factor and a difference in sharpness between the photographic subject region and the background region. For example, when the weighting factor is set to $f(\alpha)$ ($f(\alpha)$: the sharpness of the photographic subject region), the score increases as the sharpness of the photographic subject region increases. That is, as the optimum image, an image in which the sharpness of the photographic subject region is high is easily selected. For example, when the weighting factor is set to $K-f(\beta)$ wherein K is an arbitrary integer and $f(\beta)$ is the sharpness of the background region, the score increases as the sharpness of the background region decreases. That is, as the optimum image, an image in which the background region is not clear is easily selected.

The image processing device according to at least one embodiment of the present invention further includes an acquiring part that sequentially acquires images so that the determination part makes a determination for the images in acquired order, and a storing part that sequentially stores images acquired by the acquiring part after the determination part determines the optimum image.

According to the embodiment, the storing part stores the images, subsequent to the optimum image, acquired by the acquiring part. For example, when a moving image is imaged, recording is started after an image, in which the sharpness of the photographic subject is relatively high, is imaged. That is, recording of only the images (moving image) that a user wants to obtain is possible.

The image processing device may be realized with a computer. In this case, a control program which causes the computer to act as the image processing device by causing the computer to operate as each part of the image processing device, and a computer readable recording medium in which the control program is recorded also fall within the scope of an embodiment of the invention.

Based on the above, the image processing device has an advantage of being capable of selecting an image in which sharpness of a photographic subject is relatively high as compared with sharpness of a background.

What is claimed is:
1. An image processing device for selecting an image, the image processing device comprising:
a storage device configured to store program codes; and
a processing unit configured to execute the program codes to operate:
a detection part configured to detect a predetermined photographic subject from an image;
a photographic subject region identifying part configured to identify a photographic subject region that is a region on the image, the region including the predetermined photographic subject detected by the detection part;

a background region identifying part configured to identify a background region that is a region on the image, the region being other than the photographic subject region identified by the photographic subject region identifying part;

a sharpness identifying part configured to identify sharpness of the photographic subject region and sharpness of the background region;

a score calculation part configured to calculate a score, based on a difference between the sharpness of the photographic subject region and the sharpness of the background region; and a determination part configured to determine the image as an optimum image when the score calculated by the score calculation part is compared with an optimum image threshold and the score indicates that the photographic subject region is clearer than the background region;

wherein the score calculation part is configured to calculate the score by multiplying a weighting factor and a difference between the sharpness of the photographic subject region and the sharpness of the background region and the weighting factor is a value that increases as the sharpness of the photographic subject region increases or as the sharpness of the background subject region decreases.

2. The image processing device according to claim 1, wherein the determination part is configured to determine whether the photographic subject region is clear by comparing the sharpness of the photographic subject region with a photographic subject threshold, and the image is determined as the optimum image when the score is compared with the optimum image threshold and the score indicates that the photographic subject region is clearer than the background region, and when the sharpness of the photographic subject region and the photographic subject threshold are compared and the photographic subject region is determined to be clear.

3. The image processing device according to claim 1, wherein the determination part is configured to determine whether the background region is clear by comparing the sharpness of the background region with a background threshold, and the image is determined as the optimum image when the score is compared with the optimum image threshold and the score indicates that the photographic subject region is clearer than the background region, and when the sharpness of the background region is compared with the background threshold and the background region is determined to be not clear.

4. The image processing device according to claim 1, wherein the determination part is configured to determine whether the photographic subject region is clear by comparing the sharpness of the photographic subject region with a photographic subject threshold and is configured to determine whether the background region is clear by comparing the sharpness of the background region with a background threshold, and the image is determined as the optimum image when the score is compared with the optimum image threshold and the score indicates that the photographic subject region is clearer than the background region, when the sharpness of the photographic subject region and the photographic subject threshold are compared and the photographic subject region is determined to be clear, and when the sharpness of the background region is compared with the background threshold and the background region is determined to be not clear.

5. The image processing device according to claim 1, wherein the processing unit is configured to execute the program codes for operating a threshold identifying part configured to identify the optimum image threshold according to the photographic subject detected by the detection part, wherein the determination part is configured to compare the optimum image threshold identified by the threshold identifying part with the score.

6. The image processing device according to claim 1, wherein the processing unit is configured to execute the program codes for operating a scene identifying part configured to identify a scene of the image and a threshold identifying part configured to identify the optimum image threshold according to the scene identified by the scene identifying part, wherein the determination part is configured to compare the optimum image threshold identified by the threshold identifying part and the score.

7. The image processing device according to claim 1, wherein when the detection part is configured to detect a plurality of photographic subjects from the image, the score calculation part is configured to calculate a score for each photographic subject, and the determination part is configured to determine the image as the optimum image when an average of the scores calculated is compared with the optimum image threshold and the average of the scores indicates that the photographic subject regions of the plurality of photographic subjects are overall clearer than the background region.

8. The image processing device according to claim 1, wherein when the detection part is configured to detect a plurality of photographic subjects from the image,
the score calculation part is configured to calculate a score for each photographic subject, and
the determination part is configured to determine the image as the optimum image when each score is compared with the optimum image threshold and all of the scores compared indicate that the photographic subject region is clearer than the background region.

9. The image processing device according to claim 1, wherein when the detection part is configured to detect a plurality of photographic subjects from the image,
the score calculation part is configured to calculate a score for each photographic subject, and
the determination part is configured to determine the image as the optimum image when each score is compared with the optimum image threshold and any of the scores compared indicates that the photographic subject region is clearer than the background region.

10. The image processing device according to claim 1, wherein
the image includes a plurality of images, and
the determination part is configured to perform ranking of the plurality of images based on the score of each of the plurality of images.

11. The image processing device according to claim 1, wherein the processing unit is configured to execute the program codes for operating: an acquiring part configured to sequentially acquire images so that the determination part makes a determination for each of the images in acquired order, and a storing part configured to sequentially store images acquired by the acquiring part after the determination part determines the optimum image.

12. An image processing method for selecting an image, the image processing method comprising:
detecting a predetermined photographic subject from an image;
identifying a photographic subject region that is a region on the image, the region including the predetermined photographic subject detected in the detecting;

identifying a background region that is a region on the image, the region being other than the photographic subject region identified in the identifying of the photographic subject region;

identifying sharpness of the photographic subject region and sharpness of the background region;

calculating a score, based on a difference between the sharpness of the photographic subject region and the sharpness of the background region; and determining the image as an optimum image when the score calculated in the calculating is compared with an optimum image threshold and the score indicates that the photographic subject region is clearer than the background region; and calculating the score by multiplying a weighting factor and a difference between the sharpness of the photographic subject region and the sharpness of the background region, wherein the weighting factor is a value that increases as the sharpness of the photographic subject region increases or as the sharpness of the background subject region decreases.

13. A non-transitory computer-readable medium, having stored thereon computer-readable instructions for executing, by a computer, an image processing method according to claim 12.

* * * * *